Patented May 7, 1940

2,199,568

UNITED STATES PATENT OFFICE 2,199,568

MANUFACTURE OF 1-METHYL-4-CHLORO-5-HYDROXYNAPHTHALENE - 1¹ - SULPHONIC ACID

Hans Lange and Otto Hoffmann, Dessau in Anhalt, Germany, assignors to General Aniline & Film Corporation, a corporation of Delaware No Drawing. Application June 8, 1939, Serial No. 278,082. In Germany June 11, 1938

2 Claims. (Cl. 260—512)

Our present invention relates to a process for the manufacturing 1-methyl - 4 - chloro - 5 - hydroxynaphthalene-1¹-sulphonic acid and to the new product thus obtainable. This product may be represented by the formula

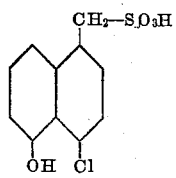

According to our invention the new and technically valuable 1 - methyl - 4 - chloro-5-hydroxynaphthalene-1¹-sulphonic acid can be produced by treating 4-chloro-5-nitro-1-naphthomethyl chloride with sodium sulphite to form the 1 -methyl-4-chloro - 5 - nitronaphthalene-1¹-sulphonic acid, by reducing the nitro group and by boiling the corresponding amino acid thus formed with sulphuric acid under pressure. The 4-chloro-5-nitro-1-naphthomethyl chloride used as starting material is obtainable by causing chlorine to act in the presence of a halide of antimony upon 1¹-chloro-1-methyl-5-nitronaphthalene dissolved in trichlorinated hydrocarbons. This process is more fully described in applicants' copending application Serial No. 277,262, filed June 3, 1939.

The 1-methyl-4-chloro-5-hydroxynaphthalene-1¹-sulphonic acid obtainable as indicated above, can be used immediately or after its separation for producing dyes.

The 1-methyl-4-chloro-5-nitronaphthalene-1¹-sulphonic acid can be separated as an intermediate product by precipitation with common salt and forms a yellow mass of crystals easily soluble in water. The corresponding amino acid is precipitated from its solution by addition of a mineral acid and forms a light grey compound which is difficultly soluble in water. The hydroxy acid is easily soluble in water. From its concentrated aqueous solution it may be precipitated by addition of common salt and can be recrystallized from methanol.

The following example serves to illustrate the invention, the parts being by weight:

256 parts of 4-chloro - 5 - nitro - 1 - naphthomethyl chloride are boiled under reflux for 10 hours together with a solution of 151 parts of anhydrous sodium sulphite in 600 parts of water. The chloride is transformed into the corresponding ω-methane sulphonic acid, whereat the solution becomes slowly clear. If separation of the 1 - methyl-4-chloro-5-nitronaphthalene - 1¹- sulphonic acid is desired, 150 parts of sodium chloride are added to the cooled solution, stirring is continued for some hours and the precipitate is filtered under suction and washed with a dilute solution of common salt. In this manner 299 parts of the nitro compound are obtainable. The amino compound preferably is won immediately from the said solution and the nitro compound by reduction in the usual manner. After washing with cold water and drying at 100° C. 201 parts of 1-methyl-4-chloro - 5 - aminonaphthalene-1¹-sulphonic acid are obtained corresponding to 74 per cent. of the theoretical yield.

272 parts of this amino compound are heated in an enamelled pressure vessel with 110 parts of concentrated sulphuric acid and 1000 parts of water to 200° C.; this temperature is maintained for 8 hours. After cooling, a clear solution of 1 - methyl - 4 - chloro-5-hydroxynaphthalene-1¹-sulphonic acid is obtained in an amount corresponding to 92 per cent. of the theoretical. For purification of the acid which is easily soluble in water the sulphuric acid is precipitated from the solution by addition of caustic lime. Then the acid is transformed in the usual manner in its sodium salt and separated by evaporation of the water in the presence of a small amount of an acid. By extraction with alcohol the pure 1-methyl-4-chloro-5-hydroxynaphthalene - 1¹- sulphonic acid is obtained in a yield corresponding to 75 per cent. of the theoretical.

What we claim is:

1. 1 - methyl-4-chloro-5-hydroxynaphthalene - 1¹-sulphonic acid, which is easily soluble in water.

2. The process which comprises boiling 4-chloro-5-nitro-1-naphthomethyl chloride with an aqueous solution of sodium sulphite, reducing the nitro group and boiling the reaction product thus obtained with dilute sulphuric acid under pressure.

HANS LANGE.
OTTO HOFFMANN.